US012731362B2

(12) United States Patent
Mishima et al.

(10) Patent No.: US 12,731,362 B2
(45) Date of Patent: Sep. 8, 2026

(54) IMAGE PROCESSING DEVICE, IMAGE PROCESSING METHOD, AND PROGRAM

(71) Applicant: NEC Corporation, Tokyo (JP)

(72) Inventors: Yoshihiro Mishima, Tokyo (JP); Naoko Asano, Tokyo (JP); Erina Kitahara, Tokyo (JP)

(73) Assignee: NEC CORPORATION, Tokyo (JP)

( * ) Notice: Subject to any disclaimer, the term of this patent is extended or adjusted under 35 U.S.C. 154(b) by 424 days.

(21) Appl. No.: 18/270,674

(22) PCT Filed: Mar. 30, 2021

(86) PCT No.: PCT/JP2021/013595

§ 371 (c)(1),
(2) Date: Jun. 30, 2023

(87) PCT Pub. No.: WO2022/208666

PCT Pub. Date: Oct. 6, 2022

(65) Prior Publication Data

US 2024/0062505 A1 Feb. 22, 2024

(51) Int. Cl.

| | |
|---|---|
| ***G06V 10/25*** | (2022.01) |
| ***G06V 10/764*** | (2022.01) |
| ***G06V 20/56*** | (2022.01) |
| ***G06V 20/58*** | (2022.01) |
| ***G06V 20/64*** | (2022.01) |

(52) U.S. Cl.

CPC ............ *G06V 10/25* (2022.01); *G06V 10/764* (2022.01); *G06V 20/58* (2022.01); *G06V 20/588* (2022.01); *G06V 20/64* (2022.01); *G06V 2201/08* (2022.01)

(58) Field of Classification Search

CPC ...... G06V 10/25; G06V 10/764; G06V 20/58; G06V 20/588; G06V 20/64; G06V 2201/08; G06V 10/774; G06V 20/56; G06V 20/70; G08G 1/166; G08G 1/165

See application file for complete search history.

(56) References Cited

U.S. PATENT DOCUMENTS

| | | | |
|---|---|---|---|
| 2008/0164983 A1 | 7/2008 | Daura et al. | |
| 2016/0217583 A1* | 7/2016 | Uchida .................. | G06V 20/58 |
| 2021/0297633 A1* | 9/2021 | Motoyama ............... | G05D 1/02 |

FOREIGN PATENT DOCUMENTS

| | | |
|---|---|---|
| JP | 2003-030776 A | 1/2003 |
| JP | 2004-326270 A | 11/2004 |

(Continued)

OTHER PUBLICATIONS

Extended European Search Report for EP Application No. 21934837.2, dated on Dec. 4, 2023.

(Continued)

*Primary Examiner* — Jianxun Yang
(74) *Attorney, Agent, or Firm* — Sughrue Mion, PLLC

(57) ABSTRACT

Among multiple different area classes designated regarding objects appearing in a captured image that has been acquired, to which area class each pixel in the captured image belongs is recognized. An unrecognized-class area not belonging to any of the multiple area classes in an area in the captured image representing a prescribed area class among the multiple different area classes is identified as an area-of-interest candidate. A determination is made regarding whether the area-of-interest candidate is a prescribed desired area.

10 Claims, 5 Drawing Sheets

(56) References Cited

FOREIGN PATENT DOCUMENTS

| | | | |
|---|---|---|---|
| JP | 2008-529183 | A | 7/2008 |
| JP | 2016-062356 | A | 4/2016 |
| JP | 2016-224797 | A | 12/2016 |
| WO | 2020/031812 | A1 | 2/2020 |

OTHER PUBLICATIONS

International Search Report for PCT Application No. PCT/JP2021/013595, mailed on Jun. 15, 2021.

* cited by examiner

*FIG. 7*

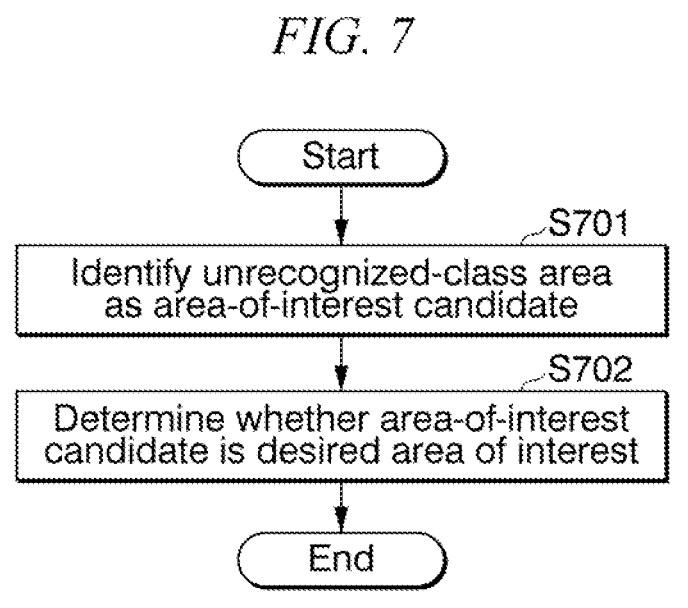

Start

S701

Identify unrecognized-class area as area-of-interest candidate

S702

Determine whether area-of-interest candidate is desired area of interest

End

IMAGE PROCESSING DEVICE, IMAGE PROCESSING METHOD, AND PROGRAM

This application is a National Stage Entry of PCT/JP2021/013595 filed on Mar. 30, 2021, the contents of all of which are incorporated herein by G8110reference, in their entirety.

TECHNICAL FIELD

Some non-limiting embodiments relates to an image processing device, an image processing method, and a program.

BACKGROUND ART

In order to recognize prescribed targets appearing in images, recognition models generated by machine-learning information such as the shapes and colors of said targets are used for recognizing the targets. However, in order to generate a recognition model by machine learning, many images serving as correct data in which the targets appear must be prepared and the images must be machine-learned, requiring time and labor. Patent Document 1 and Patent Document 2 disclose technologies for detecting obstacles as related technologies.

CITATION LIST

Patent Literature

[Patent Document 1] Japanese Unexamined Patent Application Publication No. 2016-224797

[Patent Document 2] Japanese Unexamined Patent Application Publication (Translation of PCT Application) No. 2008-529183

SUMMARY

Problems to be Solved

In image processing technologies as mentioned above, a technology for easily recognizing desired objects included in an image is sought.

Thus, an objective of the present disclosure is to provide an image processing device, an image processing method, and a program that solve the abovementioned problem.

Means for Solving the Problems

According to a first aspect of the present disclosure, an image processing device is provided with area recognizing means for recognizing, among multiple different area classes designated regarding objects appearing in a captured image that has been acquired, to which area class each pixel in a depth map image generated based on the captured image that has been acquired belongs; area-of-interest candidate identifying means for identifying, as an area-of-interest candidate, an unrecognized-class area not belonging to any of the multiple area classes in an area in the captured image representing a prescribed area class among the multiple different area classes; and area-of-interest determining means for determining whether the area-of-interest candidate is a prescribed desired area.

According to a second aspect of the present disclosure, an image processing method involves recognizing, among multiple different area classes designated regarding objects appearing in a captured image that has been acquired, to which area class each pixel in a depth map image generated based on the captured image that has been acquired belongs; identifying, as an area-of-interest candidate, an unrecognized-class area not belonging to any of the multiple area classes in an area in the captured image representing a prescribed area class among the multiple different area classes; and determining whether the area-of-interest candidate is a prescribed desired area.

According to a third aspect of the present disclosure, a program makes a computer in an image processing device function as area recognizing means for recognizing, among multiple different area classes designated regarding objects appearing in a captured image that has been acquired, to which area class each pixel in a depth map image generated based on the captured image that has been acquired belongs; area-of-interest candidate identifying means for identifying, as an area-of-interest candidate, an unrecognized-class area not belonging to any of the multiple area classes in an area in the captured image representing a prescribed area class among the multiple different area classes; and area-of-interest determining means for determining whether the area-of-interest candidate is a prescribed desired area.

Advantageous Effects of Disclosure

The present disclosure can provide a technology for easily recognizing a desired object contained in an image.

BRIEF DESCRIPTION OF THE DRAWINGS

FIG. 7 A diagram indicating the processing flow in the image processing device with the minimum configuration according to the present embodiment.

EXAMPLE EMBODIMENT

Hereinafter, an image processing device according to an embodiment of the present disclosure will be explained with reference to the drawings.

Figure 1:
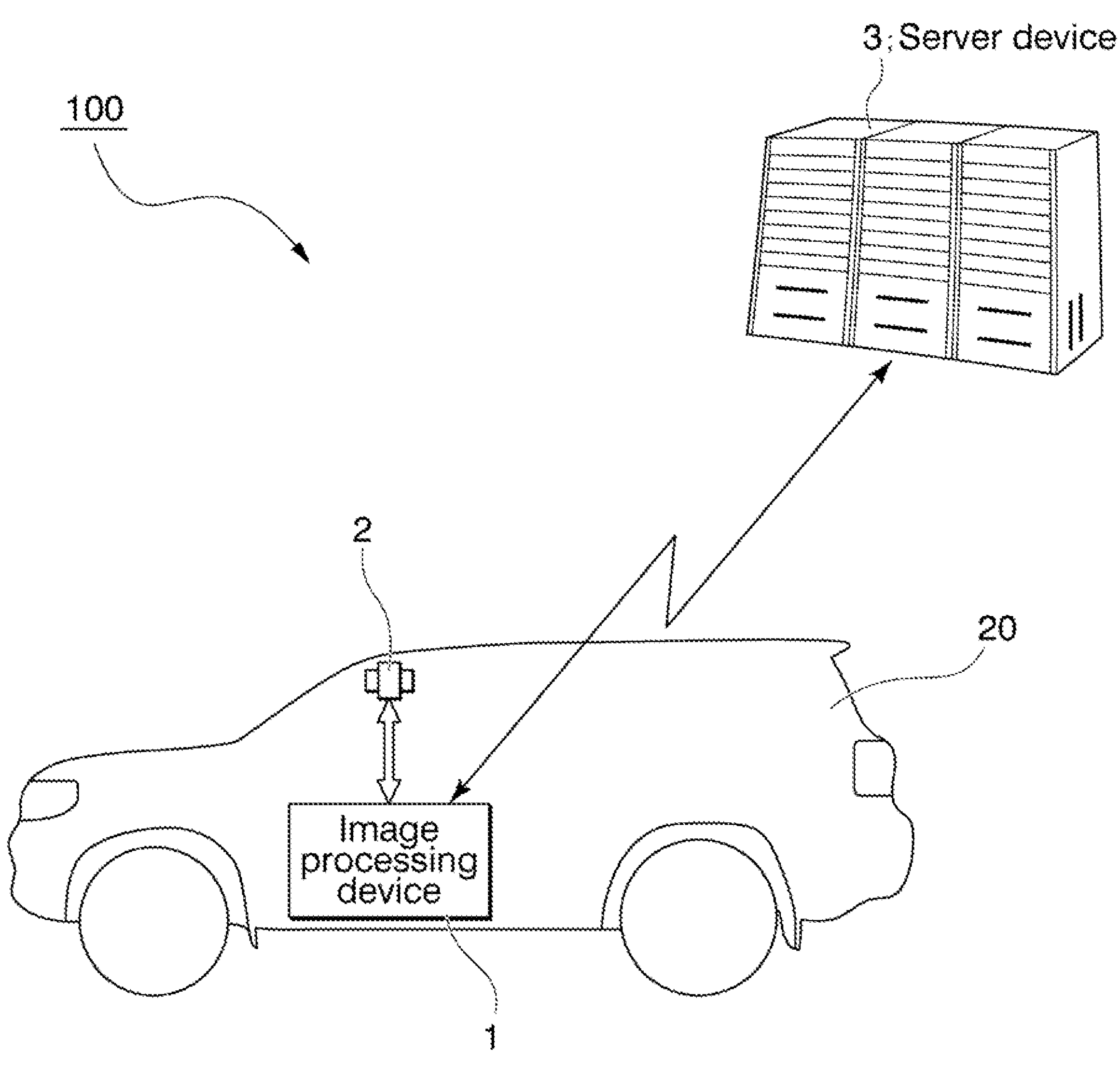
FIG. 1 A diagram schematically illustrating an image processing system according to the present embodiment.

FIG. 1 is a diagram schematically illustrating an image processing system including an image processing device according to the present embodiment.

As illustrated in FIG. 1, the image processing system 100 is constituted by an image processing device 1 and camera 2 mounted on a vehicle 20 being connected by a wireless communication network or a wired communication network. The image processing system 100 may include a server device 3. The server device 3 may be communicably connected with the image processing device 1 and the camera 2. In the present embodiment, the camera 2 captures images including a road and vehicles traveling on said road. The camera 2 outputs the images to the image processing device 1. The image processing device 1 identifies area-of-interest candidates that have the possibility of including prescribed objects using images acquired from the camera 2, and identifies, from among those area-of-interest candidates, areas of interest that seem to represent prescribed objects, etc. The image processing device 1 in the present embodiment identifies, as an area of interest, an in-image area in which an obstacle that has fallen on the road appears. By identifying the obstacle as an area of interest from the image, it can be utilized in processes, etc. for avoiding obstacles in automated driving, etc.

Figure 2:
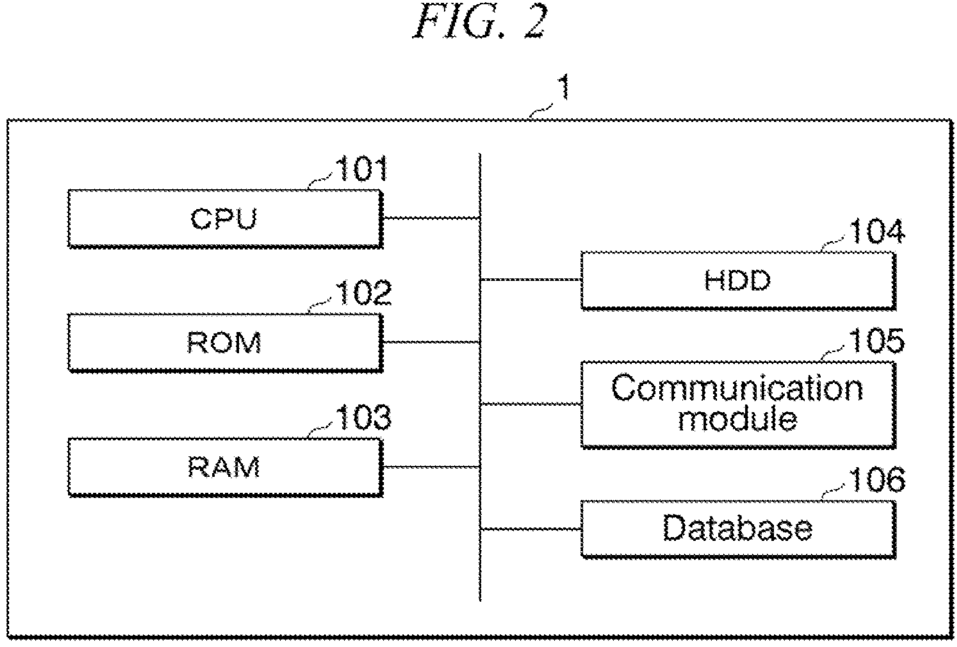
FIG. 2 A hardware configuration diagram of an image processing device according to the present embodiment.

FIG. 2 is a hardware configuration diagram of the image processing device.

As illustrated in this drawing, the image processing device 1 is a computer provided with hardware such as a CPU (Central Processing Unit) 101, a ROM (Read-Only Memory) 102, a RAM (Random Access Memory) 103, an HDD (Hard Disk Drive) 104, a communication module 105, and a database 106. The server device 3 also has a similar configuration.

Figure 3:
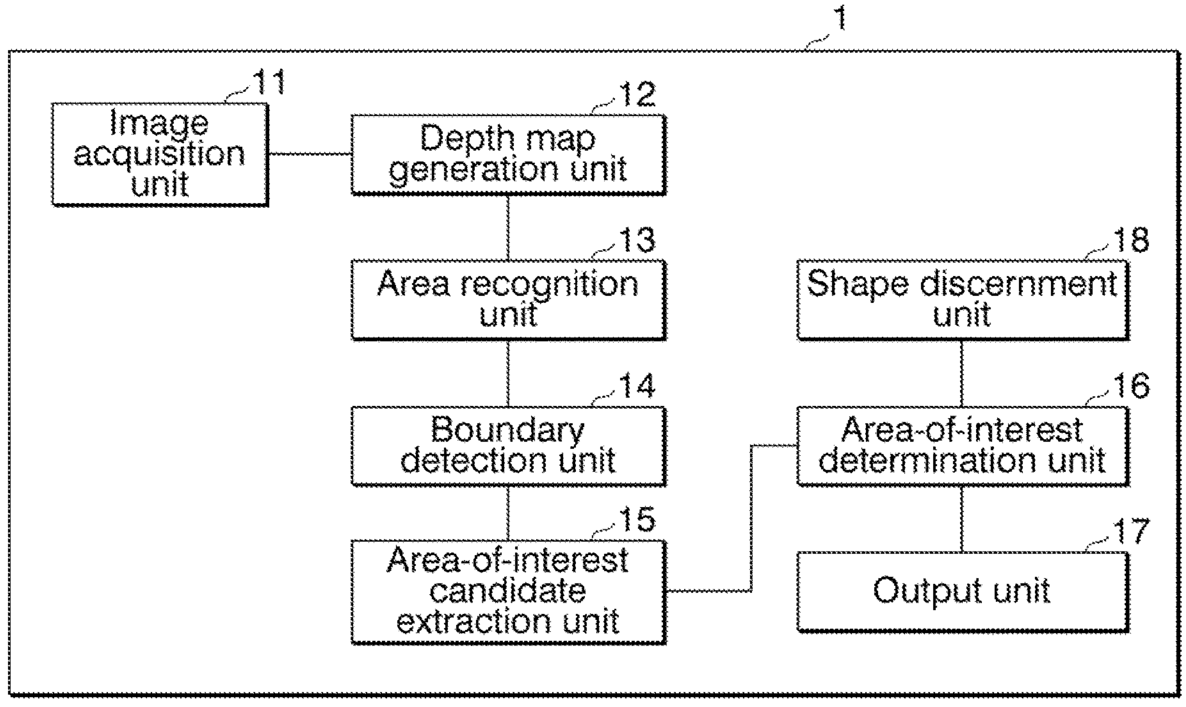
FIG. 3 A functional block diagram of the image processing device according to the present embodiment.

FIG. 3 is a functional block diagram of an image processing device.

When a power source is turned on based on the starting of the vehicle 20, the image processing device 1 is activated and executes a pre-stored image processing program. Due to this program, the image processing device 1 performs the functions of an image acquisition unit 11, a depth map generation unit 12, an area recognition unit 13, a boundary detection unit 14, an area-of-interest candidate extraction unit 15, an area-of-interest determination unit 16, an output unit 17 and a shape discernment unit 18.

The image acquisition unit 11 acquires images from the camera 2.

The depth map generation unit 12 generates depth map information using the images acquired from the camera 2.

The area recognition unit 13 recognizes, among multiple different area classes designated regarding objects appearing in said captured images, to which area class each pixel in the captured image that has been acquired belongs.

The boundary detection unit 14 detects the boundaries of each area recognized in the capture.

The area-of-interest candidate extraction unit 15 identifies, as area-of-interest candidates, unrecognized-class areas not belonging to any of the multiple different area classes among the areas in the captured images representing prescribed area classes among the multiple area classes.

The area-of-interest determination unit 16 determines whether the area-of-interest candidate is a desired area of interest.

The output unit 17 outputs the area of interest.

The shape discernment unit 18 detects the shape of the road based on a steering angle or the like obtained from CAN information, etc.

Specifically, the area-of-interest determination unit 16 determines whether an area-of-interest candidate represents a three-dimensional object based on depth information indicated by each pixel in the area-of-interest candidate, and determines that the area-of-interest candidate is an area of interest when the area-of-interest candidate represents a three-dimensional object.

The area-of-interest determination unit 16 determines whether an area-of-interest candidate represents a stationary object based on changes in the depth information indicated by each pixel in the area-of-interest candidate, and may determine that the area-of-interest candidate is an area of interest when the area-of-interest candidate represents a stationary object.

The area recognition unit 13 may recognize, among multiple different area classes designated regarding objects appearing in a captured image, to which area class each pixel in the captured image, including a road and moving objects such as vehicles traveling on said road, belongs. At this time, the area-of-interest candidate extraction unit 15 may identify, as an area-of-interest candidate, an unrecognized-class area at least partially adjacent to an area in a captured image belonging to a road class indicating a road area among the multiple area classes.

The area-of-interest determination unit 16 may determine an area of interest from among the area-of-interest candidates in areas other than areas in the captured image belonging to moving bodies among the multiple area classes.

Figure 4:
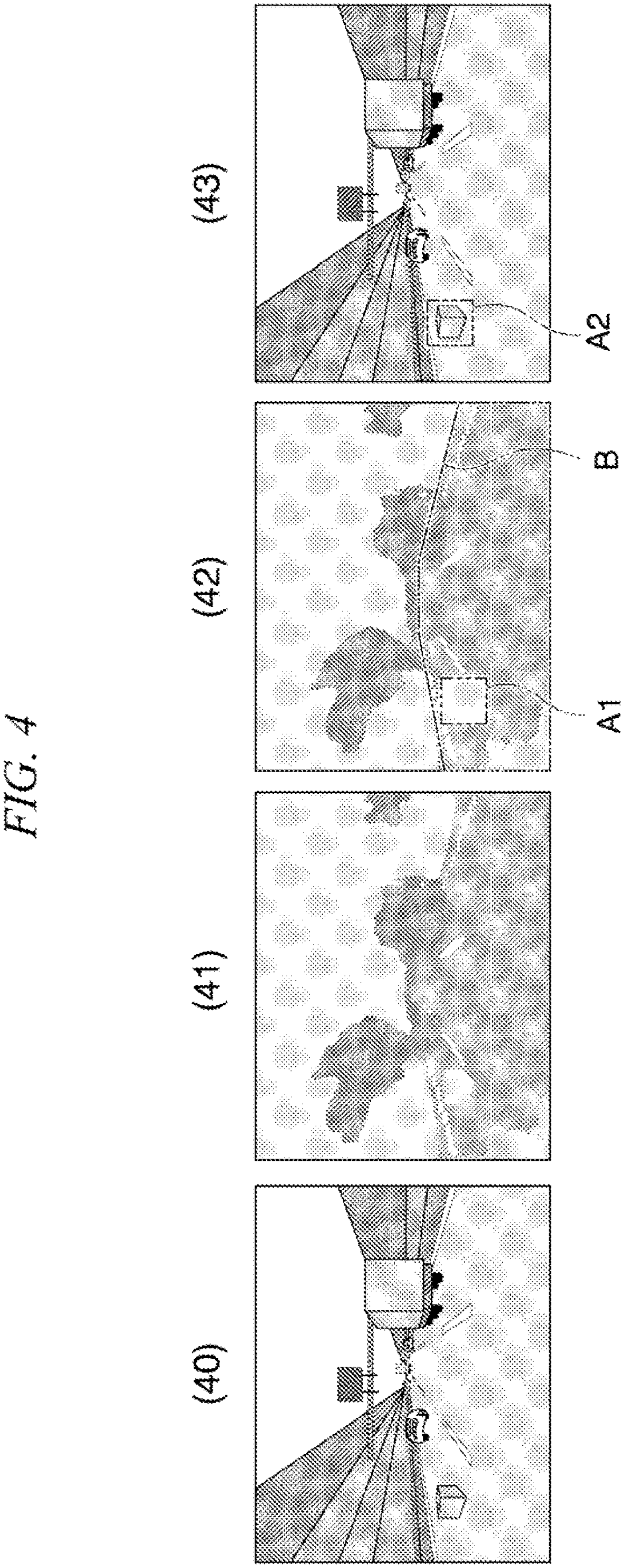
FIG. 4 A diagram illustrating a summary of the processing in the image processing device according to the present embodiment.

FIG. 4 is a diagram illustrating a summary of the processing in the image processing device.

FIG. 4 illustrates a captured image (40), a processing result (41) from the area recognition unit 13 using the captured image, a processing result (42) from the boundary detection unit 14 and the area-of-interest candidate extraction unit 15, and a processing result (43) from the area-of-interest determination unit 16. The processing result (42) from the boundary detection unit 14 and the area-of-interest candidate extraction unit 15 includes information B indicating boundaries and information on pixels indicating an area-of-interest candidate A1. Furthermore, the processing result (43) from the area-of-interest determination unit 16 includes information on pixels representing an area of interest A2.

Figure 5:
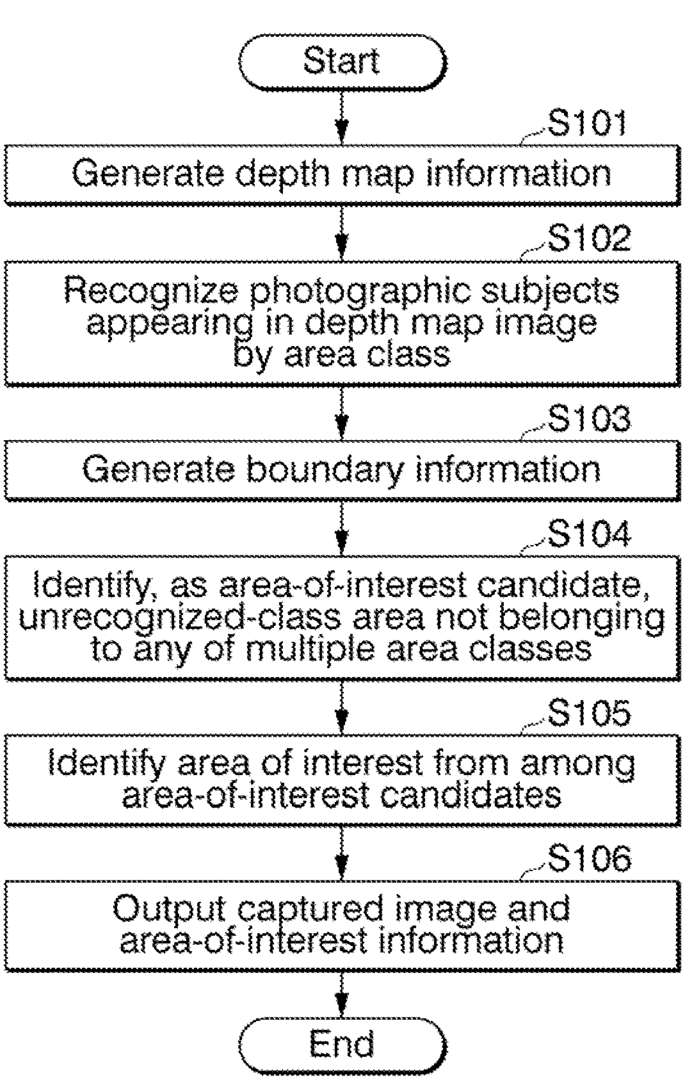
FIG. 5 A diagram indicating the processing flow in the image processing device according to the present embodiment.

FIG. 5 is a diagram illustrating the processing flow in the image processing device.

Hereinafter, the processing flow in the image processing device 1 will be explained in order.

While the vehicle 20 is traveling, the camera 2 outputs captured images generated by image capture to the image processing device 1. The image acquisition unit 11 in the image processing device 1 acquires the captured images and outputs them to the depth map generation unit 12. The depth map generation unit 12 generates depth map information based on the captured images that have been acquired (step S101). The image acquisition unit 11 may acquire depth map information generated by the camera 2 in advance. In this case, the depth map generation unit 12 does not need to be provided in the image processing device 1. The depth map information is array information of the distance to a photographic subject included for each pixel in each captured image. The depth map information may be generated by known technology. The depth map generation unit 12 outputs depth map information to the boundary detection unit 14 and the area-of-interest determination unit 16.

The area recognition unit 13 acquires a captured image (40). The area recognition unit 13 recognizes photographic subjects appearing in the captured image by area class, such as sky, wall, road, moving body (traffic participant), person, etc. (step S102). The technology by which the area recognition unit 13 recognizes each pixel in the captured image by area classes representing multiple different targets may be a known technology. During this process, the area recognition unit 13 calculates the probability that each pixel in the captured image belongs to each area class. The area recognition unit 13 generates area recognition information retaining, for each pixel, information regarding a probability of belonging to each area class. The area recognition information is array information of the probability information by area class for each pixel in the captured image. The area recognition unit 13 outputs area recognition information, which is the processing result (41), to the boundary detection unit 14. The area recognition unit 13 may calculate the probability by area class for each pixel in the captured image by using an area class calculation model that receives a captured image as an input and that outputs the probabilities of belonging to multiple predefined area classes. The area class calculation model may, for example, be a model that has undergone machine learning by taking many images as inputs, and with information indicating the area class of each pixel in the images as correct data, has learned the relationship therebetween. The area recognition unit 13 may acquire a steering angle from CAN information acquired from a shape discernment unit 18, estimate the curvature of a road in accordance with the steering angle based on that information, and recognize the shape of a road based on the estimation results, etc. For example, if the steering angle is an angle of 15 degrees to the left, then the road is curved to the left. The area recognition unit 13 may recognize, in depth map information, that the far left is curved in the leftward direction, and may use colors and brightness in the image, as well as information indicating leftward curvature, to raise the probability of a pixel being in the road class by multiplying the probability of the pixel being in the road class by a correction coefficient so that the probability of the pixel on the left side of the center of the image being in the road class becomes higher.

The boundary detection unit 14 acquires the area recognition information. The boundary detection unit 14 identifies pixels for which the area classes are different from those of adjacent pixels based on the area class probability corresponding to each pixel in the captured image included in the area recognition information, and generates boundary information retaining boundary flags for those pixels (step S103). The boundary information is array information that is information indicating whether or not the area class of each pixel is at a boundary with another area class. The boundary detection unit 14 outputs the depth map information, the area recognition information, and the boundary information to the area-of-interest candidate extraction unit 15.

The area-of-interest candidate extraction unit 15 acquires the captured image, the depth map information, the area recognition information, and the boundary information. The area-of-interest candidate extraction unit 15 identifies as an area-of-interest candidate, among the areas in the captured image indicating a prescribed area class that has been designated among the multiple different area classes, an unrecognized-class area not belonging to any of those multiple area classes, using the area recognition information (step S104). For example, in the case in which the multiple area classes are area classes such as sky, wall, road, moving body (traffic participant), person, etc., if the prescribed area class that has been designated is the road class, the area-of-interest candidate extraction unit 15 identifies, from among the areas in the road class, an area of pixels for which all of the probabilities for the multiple area classes are less than a prescribed probability value, and identifies this area as a class-unrecognized area. The area-of-interest candidate extraction unit 15 identifies the class-unrecognized area as an area-of-interest candidate.

The area-of-interest candidate extraction unit 15 may define, as an area-of-interest candidate, a class-unrecognized area at least partially adjacent to an area in the captured image belonging to the road class indicating a road area among the multiple designated area classes, and may identify the area-of-interest candidate as a candidate of interest. In other words, a class-unrecognized area at least partially adjacent to an area in the captured image belonging to the road class indicating a road area among the multiple designated area classes is an area traversing a boundary between the road class and another class, and the area-of-interest candidate extraction unit 15 may determine such an area to be a class-unrecognized area. After a class-unrecognized area has been identified as an area-of-interest candidate, the area-of-interest candidate extraction unit 15 generates area-of-interest candidate information indicating array information of pixels representing the area-of-interest candidate. The area-of-interest candidate extraction unit outputs the captured image, the depth map information, the area recognition information, the boundary information, and the area-of-interest candidate information to the area-of-interest determination unit 16.

The area-of-interest determination unit 16 acquires the captured image, the depth map information, the area recognition information, the boundary information, and the area-of-interest candidate information. The area-of-interest determination unit 16 identifies an area of interest from among the area-of-interest candidates indicated by the area-of-interest candidate information (step S105). Specifically, the area-of-interest determination unit 16 acquires the depth information indicated by each pixel in an area-of-interest candidate from the depth map information, and determines whether the area-of-interest candidate represents a three-dimensional object based on the depth information. The area-of-interest determination unit 16, when determining that the area-of-interest candidate represents a three-dimensional object, determines that the area-of-interest candidate is an area of interest. As one example, when the depth information of pixels representing an area-of-interest candidate is uniform in the vertical direction or in the horizontal direction, the area-of-interest determination unit 16 determines that the areas thereof constitute surfaces and thus they form a three-dimensional object. Thus, this area-of-interest candidate is determined to be an area of interest. The depth information being uniform in the vertical direction or in the horizontal direction refers to a case in which the error in depth information, compared with the depth information of a pixel serving as a reference, of every other adjacent pixel with respect to the pixel serving as the reference, is less than a prescribed value. Even in the case in which, with a certain pixel as the reference, the depth information of that reference pixel and adjacent pixels adjacent to the reference pixel do not represent a uniform surface, if an area including those pixels is determined to be an area representing a three-dimensional object rather than a horizontal surface based on the depth information of the reference pixel and the pixels adjacent thereto, the area-of-interest determination unit 16 may determine that area to be an area of interest. For example, in the case in which the difference in the depth information between a certain reference pixel and adjacent pixels is such that a difference indicating a continuous surface continuously occurs, then the area-of-interest determination unit 16 may determine that the area is an area of interest, assuming there is a three-dimensional object.

The area-of-interest determination unit 16 may determine whether or not an area-of-interest candidate represents a stationary object based on changes in the depth information indicated by each pixel in the area-of-interest candidate, and may determine that the area-of-interest candidate is an area of interest when the area-of-interest candidate represents a stationary object. For example, the area-of-interest determination unit 16 calculates the change in distance of an area-of-interest candidate during a prescribed period from the change in depth information in that area. Additionally, the area-of-interest determination unit 16 calculates the change in distance of a pixel in an area determined to be a moving object during the same period from the change in the depth information in that area. The area-of-interest determination unit 16 determines that an area-of-interest candidate is a stationary object when the difference between the change in the absolute value of the change in the distance of the area-of-interest candidate during the prescribed period and the change in the absolute value of the change in the distance of the pixel in the area determined to be a moving body during the same period is equal to or greater than a prescribed change threshold value. When a camera 2 on a moving body is used as the reference, the distance of another moving body traveling at about the same speed as the moving body provided with the camera 2 will not largely differ, whereas the distance of a stationary object will largely differ. Therefore, such a process can be used to determine that the area-of-interest candidate is a stationary object. If an area-of-interest candidate is determined to be a three-dimensional object and is also determined to be a stationary object, the area-of-interest determination unit 16 may determine that the area-of-interest candidate is an area of interest. Even in the case in which an area-of-interest candidate is not determined to be a three-dimensional object, if it is determined to be a stationary object, the area-of-interest determination unit 16 may determine that the area-of-interest candidate is an area of interest.

The area-of-interest determination unit 16 may also determine area-of-interest candidates in areas other than areas in a captured image belonging to classes including moving bodies to be areas of interest. Areas belonging to classes including moving bodies are areas for which the probabilities for said classes included among the values in the area recognition information corresponding to each pixel in the captured image are a prescribed probability or higher. The area-of-interest determination unit 16 merely requires to determine areas of interest, from among the area-of-interest candidates other than the areas recognized to be areas of such classes including moving bodies.

The area-of-interest determination unit 16 may acquire a steering angle from CAN information acquired from a shape discernment unit 18, estimate the curvature of a road in accordance with the steering angle based on that information, recognize the shape of a road from the estimation results, etc., and correct the recognition results in the area recognition unit 13. For example, if the steering angle is an angle of 15 degrees to the left, then the road is curved to the left. The area recognition unit 13 may recognize, in depth map information, that the far left is curved in the leftward direction, and may use colors and brightness in the image, as well as information indicating leftward curvature, to increase the probability of a pixel being in the road class by multiplying the probability of the pixel being in the road class by a correction coefficient so that the probability of the pixel on the left side of the center of the image being in the road class becomes higher. The area-of-interest determination unit 16 may determine, using the area recognition information obtained by correcting the recognition results from the area recognition unit 13, an area of interest among the area-of-interest candidates.

Even if an area of interest is determined from among the area-of-interest candidates, the area-of-interest determination unit 16 may not immediately output the area as an area of interest. For example, the area-of-interest determination unit 16 may use multiple captured images, determine areas of interest with little displacement for which the displacement in the position between the captured images is a threshold value or lower to be the same area of interest, and if the same area of interest is included in all of the captured images, may determine that area to be an area of interest. For example, in the case in which the same area of interest is included in a prescribed number of consecutive captured images, then that area of interest may be chosen to be output. If the size of an area-of-interest candidate is a prescribed size or greater, the area-of-interest candidate 16 may determine that it is an area of interest. After an area of interest has been identified, the area-of-interest determination unit 16 may generate area-of-interest information indicating array information of pixels representing the area of interest. The area-of-interest determination unit 16 outputs the area-of-interest information to the output unit 17.

The output unit 17 outputs the captured image and the area-of-interest information to a prescribed device (step S106). For example, if an area of interest does not belong to any of the multiple area classes that have been designated in advance, then there is a high probability that the area of interest is an obstacle. Therefore, if the output destination is, for example, an automated driving processing device, then the obstacle can be recognized and a stopping operation of the vehicle 20 can be controlled.

According to the process above, an area of interest representing an object deserving interest, such as an obstacle, appearing in an image generated by the camera 2 can be determined without learning the object deserving interest. Thus, a technology for easily recognizing desired objects included in an image can be provided.

According to the above-mentioned process, the image processing device 1 determines areas of interest. However, the image processing device 1 may transmit images acquired by the camera 2 to the server device 3, and the server device 3 may determine areas of interest in the acquired images by a process similar to the above-mentioned process. Additionally, the server device 3 may perform just a part of the above-mentioned process and the server device 3 may transmit the result thereof to the image processing device 1. The image processing device 1 may then determine the areas of interest by performing the subsequent process in a manner similar to the above-mentioned process.

As the above-mentioned process, a process for determining image areas of obstacles, etc. in captured images obtained by a camera 2 provided in the vehicle 20 capturing images in front of the vehicle 20 that is traveling was specifically described. However, the image processing device 1 may determine image areas of obstacles, etc. in captured images captured by a camera 2 provided in a moving body that flies through the air, such as an aircraft, capturing images in front of the moving object that is moving. Additionally, the image processing device may similarly determine a desired area of interest in a desired image.

Figure 6:
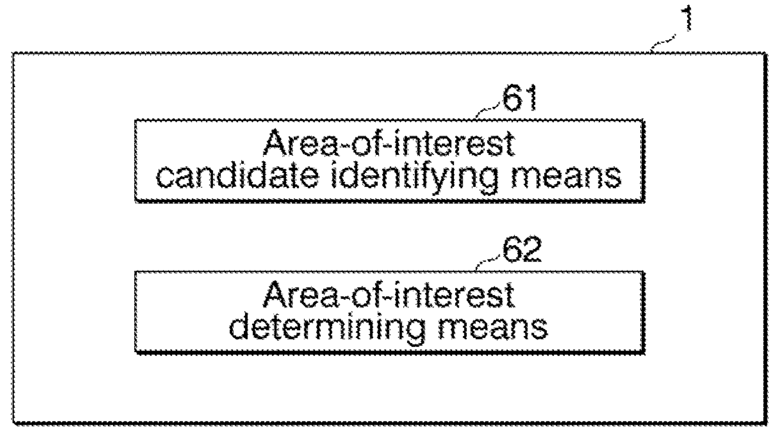
FIG. 6 A diagram illustrating a minimum configuration of the image processing device according to the present embodiment.

FIG. 6 is a diagram illustrating the minimum configuration of the image processing device.

FIG. 7 is a diagram indicating the processing flow in the image processing device with the minimum configuration.

The image processing device 1 is provided with at least an area-of-interest candidate identifying means 61 and an area-of-interest determining means 62.

The area-of-interest candidate identifying means 61 identifies, as an area-of-interest candidate, an unrecognized-class area not belonging to any of the multiple area classes, in an area in the captured image representing a prescribed area class among the multiple different area classes (step S701).

The area-of-interest determining means 62 determines whether the area-of-interest candidate is a desired area of interest (step S702).

The respective devices mentioned above have internal computer systems. Furthermore, the steps in the respective processes mentioned above are stored, in the form of a program, in a computer-readable recording medium, and the above-mentioned processes are performed by a computer reading and executing this program. In this case, a computer-readable recording medium refers to a magnetic disk, a magneto-optic disk, a CD-ROM, a DVD-ROM, a semiconductor memory, or the like. Additionally, this computer program may be transmitted to a computer by means of a communication line, and the computer that has received this transmission may execute said program.

Additionally, the above-mentioned program may be for realizing just some of the aforementioned functions. Furthermore, it may be a so-called difference file (difference program) that can realize the aforementioned functions by being combined with a program already recorded in a computer system.

REFERENCE SIGNS LIST

1 Image processing device
2 Camera
3 Server device
11 Image acquisition unit
12 Depth map generation unit
13 Area recognition unit
14 Boundary detection unit
15 Area-of-interest candidate extraction unit (area-of-interest candidate identifying means)
16 Area-of-interest determination unit (area-of-interest determining means)
17 Output unit
18 Shape discernment unit

What is claimed is:

1. An image processing device comprising:

at least one memory configured to store instructions; and at least one processor configured to execute the instructions to:

recognize, among multiple different area classes designated regarding objects appearing in a captured image, which of the multiple different area classes each pixel in the captured image belongs to;

identify, as an area-of-interest candidate, an unrecognized-class area not belonging to any of the multiple area classes, in an area in the captured image representing a prescribed area class among the multiple different area classes;

determine an area-of-interest from among area-of-interest candidates; and determine whether the area-of-interest candidate represents a stationary object, based on a difference between an absolute value of a change in distance of pixels in the area-of-interest candidate during a predetermined period, which is calculated based on a change in depth information indicated by the pixels, and an absolute value of a change in distance of pixels in an area determined to be a moving body during the predetermined period, wherein it is determined that the area-of-interest candidate represents the stationary object, when the difference between the absolute value of the change in distance of the pixels in the area-of-interest candidate and the absolute value of the change in distance of the pixels in the area determined to be the moving body, is equal to or greater than a change threshold value.

2. The image processing device according to claim 1, wherein the at least one processor is configured to execute the instructions to:

determine whether the area-of-interest candidate represents a three-dimensional object based on the depth information, and determine that the area-of-interest candidate is the area-of-interest when the area-of-interest candidate represents the three-dimensional object.

3. The image processing device according to claim 1, wherein the at least one processor is configured to execute the instructions to:

determine whether the area-of-interest candidate represents the stationary object based on the change in the depth information, and determine that the area-of-interest candidate is the area-of-interest when the area-of-interest candidate represents the stationary object.

4. The image processing device according to claim 1, wherein the at least one processor is configured to execute the instructions to:

recognize, among the multiple different area classes designated regarding objects appearing in the captured image, which of the multiple different area classes each pixel in the captured image, including a road and moving bodies traveling on the road, belongs to; and identify, as the area-of-interest candidate, an unrecognized-class area at least partially adjacent to an area in the captured image belonging to a road class representing a road area among the multiple different area classes.

5. The image processing device according to claim 1, wherein the at least one processor is configured to execute the instructions to:

determine the area-of-interest, from among the area-of-interest candidates in areas other than an area in the captured image belonging to the moving body among the multiple different area classes.

6. The image processing device according to claim 1, wherein the at least one processor is configured to execute the instructions to:

recognize a shape of a road based on a curvature of the road, which is estimated based on a steering angle of CAN information, and increases a probability of pixels, indicating being in a road class representing a road area among the multiple different area classes, according to the recognized shape of the road.

7. The image processing device according to claim 1, wherein the at least one processor is configured to execute the instructions to:

recognize a shape of a road based on a brightness of pixels in the captured image and depth information which is array information of a distance to an object for each pixel in the captured image, and increases a probability of pixels, indicating being in a road class representing a road area among the multiple different area classes, according to the recognized shape of the road.

8. The image processing device according to claim 1, wherein the at least one processor is configured to execute the instructions to:

determine the area-of-interest for each of a plurality of captured images, and identify the area-of-interest in which a displacement in a position between the plurality of captured images is less than or equal to a threshold value from among area-of-interests that are determined.

9. An image processing method that comprises:

recognizing, among multiple different area classes designated regarding objects appearing in a captured image, which of the multiple different area classes each pixel in the captured image belongs to;

identifying, as an area-of-interest candidate, an unrecognized-class area not belonging to any of the multiple area classes in an area in the captured image representing a prescribed area class among the multiple different area classes;

determining an area-of-interest from among area-of-interest candidates; and determining whether the area-of-interest candidate represents a stationary object, based on a difference between an absolute value of a change in distance of pixels in the area-of-interest candidate during a predetermined period, which is calculated based on a change in depth information indicated by the pixels, and an absolute value of a change in distance of pixels in an area determined to be a moving body during the predetermined period, wherein it is determined that the area-of-interest candidate represents the stationary object, when the difference between the absolute value of the change in distance of the pixels in the area-of-interest candidate and the absolute value of the change in distance of the pixels in the area determined to be the moving body, is equal to or greater than a change threshold value.

10. A non-transitory computer-readable storage medium storing program that makes a computer in an image processing device to execute processes, the processes comprising:

recognizing, among multiple different area classes designated regarding objects appearing in a captured image, which of the multiple different area classes each pixel in the captured image belongs to;

identifying, as an area-of-interest candidate, an unrecognized-class area not belonging to any of the multiple area classes in an area in the captured image representing a prescribed area class among the multiple different area classes;

determining an area-of-interest from among area-of-interest candidates; and determining whether the area-of-interest candidate represents a stationary object, based on a difference between an absolute value of a change in distance of pixels in the area-of-interest candidate during a predetermined period, which is calculated based on a change in depth information indicated by the pixels, and an absolute value of a change in distance of pixels in an area determined to be a moving body during the predetermined period, wherein it is determined that the area-of-interest candidate represents the stationary object, when the difference between the absolute value of the change in distance of the pixels in the area-of-interest candidate and the absolute value of the change in distance of the pixels in the area determined to be the moving body, is equal to or greater than a change threshold value.

* * * * *